United States Patent
Shimizu

(10) Patent No.: US 10,616,428 B2
(45) Date of Patent: Apr. 7, 2020

(54) IMAGE READING APPARATUS AND IMAGE READING METHOD

(71) Applicant: CANON KABUSHIKI KAISHA, Tokyo (JP)

(72) Inventor: Hiromu Shimizu, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/839,568

(22) Filed: Dec. 12, 2017

(65) Prior Publication Data

US 2018/0176401 A1 Jun. 21, 2018

(30) Foreign Application Priority Data

Dec. 16, 2016 (JP) .................................. 2016-244048

(51) Int. Cl.
*H04N 1/00* (2006.01)

(52) U.S. Cl.
CPC ..... *H04N 1/00708* (2013.01); *H04N 1/00005* (2013.01); *H04N 1/00018* (2013.01); *H04N 1/00034* (2013.01); *H04N 1/00092* (2013.01)

(58) Field of Classification Search
None
See application file for complete search history.

(56) References Cited

U.S. PATENT DOCUMENTS

| | | | | |
|---|---|---|---|---|
| 2002/0041406 A1* | 4/2002 | Takahashi | ................ | H04N 1/38 358/519 |
| 2007/0285690 A1* | 12/2007 | Matsuda | ................ | H04N 1/401 358/1.9 |
| 2015/0294523 A1* | 10/2015 | Smith | ................ | G07D 7/00 382/140 |

FOREIGN PATENT DOCUMENTS

| | | |
|---|---|---|
| JP | 2001-036696 | 2/2001 |
| JP | 2009-164808 | 7/2009 |
| JP | 2009-171217 | 7/2009 |

OTHER PUBLICATIONS

U.S. Appl. No. 15/839,558, filed Dec. 12, 2017.
U.S. Appl. No. 15/839,564, filed Dec. 12, 2017.

* cited by examiner

*Primary Examiner* — Frantz Bataille
(74) *Attorney, Agent, or Firm* — Venable LLP

(57) ABSTRACT

Provided is an image reading apparatus, including: a reading unit configured to read an original image of an original placed on an original table for each line in a main scanning direction; and a control unit. The control unit is configured to derive, from the original image read for a predetermined number of lines by the reading unit, a luminance difference value between luminance values of two pixels each separated by a first distance from a pixel of interest that is located at a predetermined position in the main scanning direction, and a difference value between a maximum luminance value and a minimum luminance value of pixels within a range of a second distance, which is larger than the first distance, from the pixel of interest.

10 Claims, 12 Drawing Sheets

IMAGE READING APPARATUS AND IMAGE READING METHOD

BACKGROUND OF THE INVENTION

Field of the Invention

The present invention relates to an image reading apparatus configured to read an image formed on an original (hereinafter referred to as "original image") and an image reading method thereof.

Description of the Related Art

An image reading apparatus configured to read an original image, while moving a reading unit in a sub-scanning direction with respect to an original placed on an original table, can detect a size of the original based on the read original image. For example, the image reading apparatus detects an original edge (original end portion) from the read original image to determine the original size based on a result of the detection. In this detection method, when dust, hair, or other dirt adheres to the original table or an original pressing member mounted to a back surface of a platen, the dust, hair, or other dirt may be falsely detected as the original edge. An image reading apparatus of Japanese Patent Application Laid-open No. 2001-36696 determines whether each pixel of the read image is an original region candidate pixel or an original region outside candidate pixel to detect the original edge based on the number of continuous candidate pixels.

In the image reading apparatus of Japanese Patent Application Laid-open No. 2001-36696, the original pressing member provided to the platen has a black color on the original table side. Alternatively, the image reading apparatus of Japanese Patent Application Laid-open No. 2001-36696 is based on a premise that the original is read with the platen kept open. In this manner, a luminance of a region outside the original region is decreased, and thus the determination between the original region candidate and the original region outside candidate is facilitated. However, such an image reading apparatus is required to change the original pressing member, which normally has a white color on the original table side. Alternatively, when the original is read with the platen kept open, a user may feel dazzled due to a light source irradiating the original with light.

The present invention has been made in view of the above-mentioned problems, and has an object to provide an image reading apparatus capable of detecting an original size with high accuracy while an influence of dirt is suppressed without the need to replace an original pressing member or read an original with a platen kept open.

SUMMARY OF THE INVENTION

An image reading apparatus according to the present disclosure includes: a reading unit configured to read an original image of an original placed on an original table for each line in a main scanning direction; and a controller configured to: derive, from the original image read for a predetermined number of lines by the reading unit, a first difference value between luminance values of two pixels each separated by a predetermined first distance from a pixel of interest that is located at a predetermined position in the main scanning direction, and a second difference value between a maximum luminance value and a minimum luminance value of pixels within a range of a second distance, which is larger than the predetermined first distance, from the pixel of interest; determine whether the pixel of interest is a pixel of an original edge based on the first difference value and the second difference value; and detect a size of the original based on a position of the pixel of interest in a case where the pixel of interest is the pixel of the original edge.

Further features of the present invention will become apparent from the following description of exemplary embodiments (with reference to the attached drawings).

DESCRIPTION OF THE EMBODIMENTS

Embodiments of the present invention are described below in detail with reference to the drawings.

Overall Configuration

Figure 1:
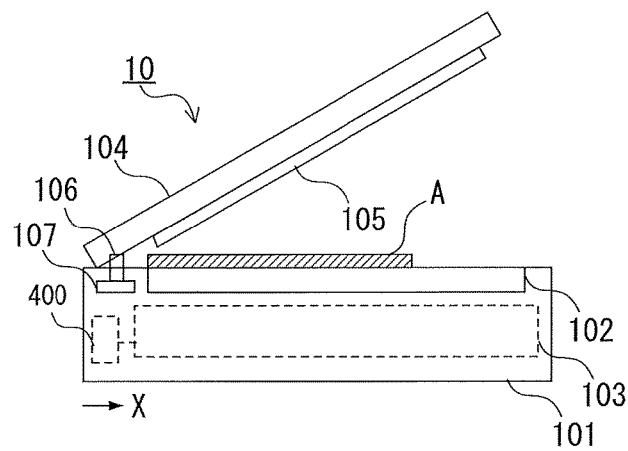
FIG. 1 is a configuration diagram of an image reading apparatus.
Figure 2:
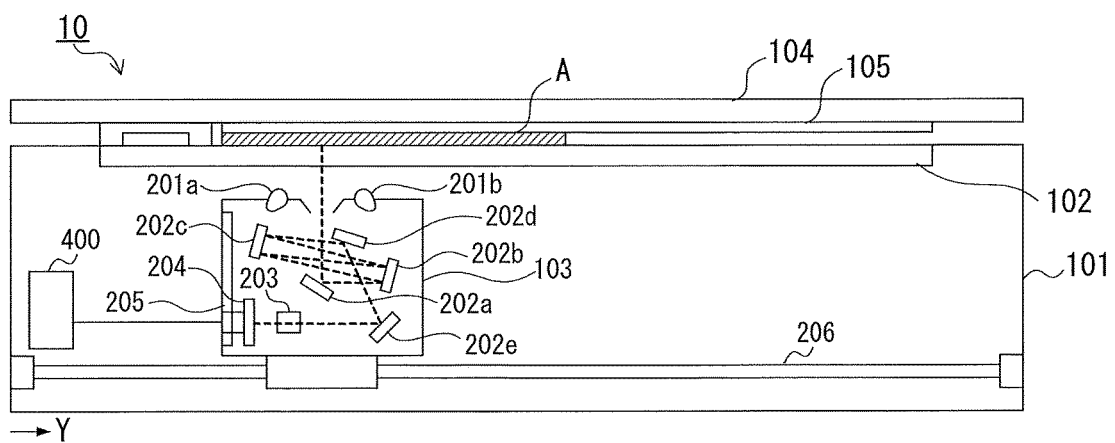
FIG. 2 is a configuration diagram of the image reading apparatus.

FIG. 1 and FIG. 2 are configuration diagrams of an image reading apparatus according to an embodiment of the present invention. An image reading apparatus 10 includes a box-shaped casing 101, an original table 102 on which an original A to be read is to be placed, and a platen 104 having mounted thereon an original pressing member 105 configured to press the original A.

A reading unit 103 configured to read an original image from the original A and a control unit 400 are built into the casing 101. The original table 102 is formed of a transparent member, for example, glass. The original A is placed so that its surface to be read faces toward the original table 102 side. The platen 104 is mounted to the casing 101 so that the platen 104 can be opened and closed. The casing 101 includes a platen open/close detection flag 106 and a platen open/close sensor 107 so as to detect whether the platen 104 is in an open state or a closed state. The position of the platen open/close detection flag 106 changes when the platen 104 is opened and closed, and thus the output of the platen open/close sensor 107 changes. The original pressing member 105 has a white surface on the side on which the original pressing member 105 presses the original A.

The reading unit 103 includes illumination units 201a and 201b, reflective mirrors 202a to 202e, an imaging lens 203, a light receiving unit 204, and a sensor board 205. The illumination units 201a and 201b irradiate the original A with light. The illumination units 201a and 201b each include a plurality of light emitting elements such as light emitting diodes (LEDs) that are arranged linearly in an arrow X direction. The reflective mirrors 202a to 202e construct an optical system for introducing the light reflected from the original A to the imaging lens 203. The imaging lens 203 images the reflective light introduced by the reflective mirrors 202a to 202e to a light receiving surface of the light receiving unit 204.

The light receiving unit 204 outputs an electrical signal based on the reflective light received at the light receiving surface. The electrical signal is an analog signal indicating the original image read from the original A. The light receiving unit 204 includes a plurality of photoelectric conversion elements such as charge coupled device (CCD) sensors that are arranged in the same direction as a row of the light emitting elements. The light receiving unit 204 is mounted on the sensor board 205. The sensor board 205 is connected to a control unit 400, and transmits the analog signal output from the light receiving unit 204 to the control unit 400. The configuration of the control unit 400 is described later.

The reading unit 103 having such a configuration reads the original image in the arrow X direction, which serves as a main scanning direction, and in which the light emitting element rows of the illumination units 201a and 201b and the photoelectric conversion element row of the light receiving unit 204 are arranged. The reading unit 103 is provided on a rail 206, and reads the original image while moving on the rail 206 in an arrow Y direction. The arrow Y direction serves as a sub-scanning direction orthogonal to the main scanning direction.

Figure 3:
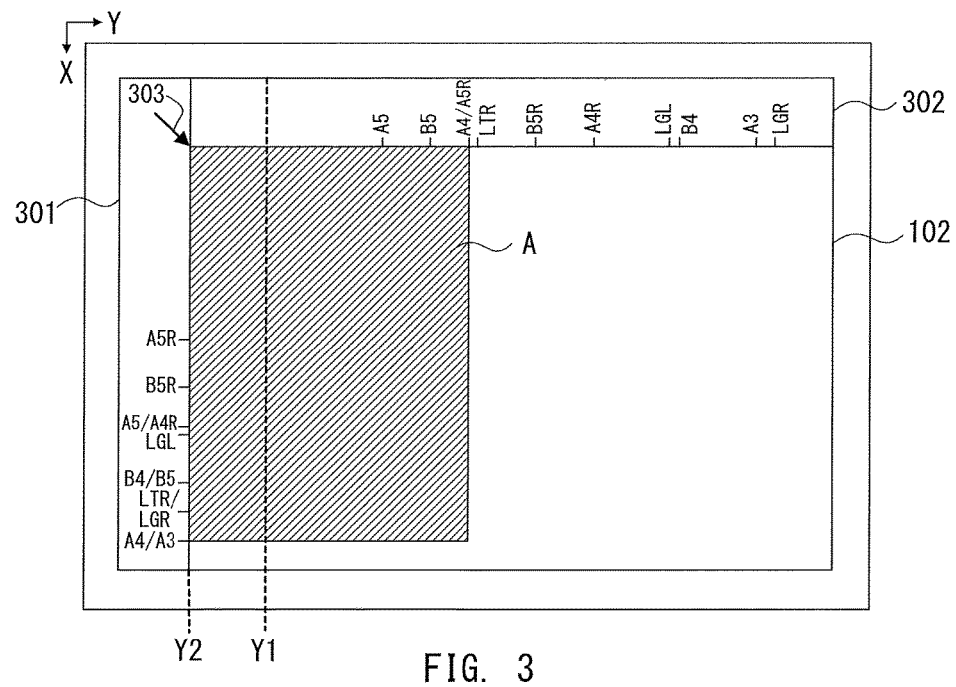
FIG. 3 is an explanatory diagram of an original table side of a casing.

FIG. 3 is an explanatory diagram of the original table 102 side of the casing 101. In the surrounding of the original table 102, a main scanning original size index 301, a sub-scanning original size index 302, and a reference position 303 used when the original A is placed are marked. The original A is placed on the original table 102 so that its corner portion matches with the reference position 303. The main scanning original size index 301 is an index of a size in the main scanning direction of the original A placed so as to match with the reference position 303. The sub-scanning original size index 302 is an index of a size in the sub-scanning direction of the original A placed so as to match with the reference position 303. In the example of FIG. 3, an A4-sized original A is placed.

The original size of the original A in the main scanning direction is started to be detected from an original size detection position Y1. The original A is started to be read from an original reading start position Y2 when the original image is read. The original size detection position Y1 is set to a position separated from the original reading start position Y2 in the sub-scanning direction by a predetermined distance.

The control unit 400 moves the reading unit 103 to the original size detection position Y1 when the platen open/close sensor 107 detects the open state of the platen 104. When the platen open/close sensor 107 detects the closed state of the platen 104, the control unit 400 causes the reading unit 103 to turn on the illumination units 201a and 201b, and moves the reading unit 103 from the original size detection position Y1 to the original reading start position Y2. At this time, the reading unit 103 reads the original A for a predetermined number of lines in the main scanning direction. The control unit 400 detects the original edge of the original A based on a result of the reading performed by the reading unit 103, and detects the original size based on the original edge. The illumination units 201a and 201b are turned on after the platen 104 is in the closed state, and hence the light of the illumination units 201a and 201b does not reach the user's eyes.

Figure 4:
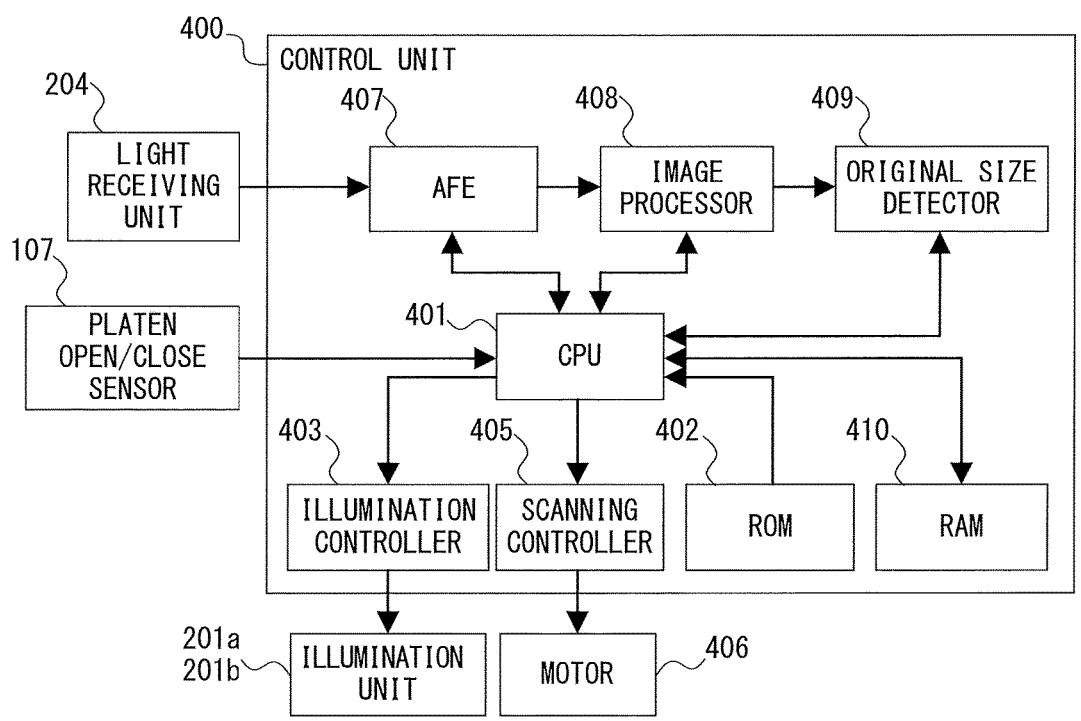
FIG. 4 is a block diagram of a control unit.

FIG. 4 is a block diagram of the control unit 400. The illumination units 201a and 201b and the light receiving unit 204 of the reading unit 103, the platen open/close sensor 107, and a motor 406 are connected to the control unit 400. The motor 406 is a drive source for moving the reading unit 103 along the rail 206.

The control unit 400 is a computer system including a central processing unit (CPU) 401, a read only memory (ROM) 402, and a random access memory (RAM) 410. The CPU 401 executes a computer program stored in the ROM 402 using the RAM 410 as a work area, to thereby control the operation of the image reading apparatus 10. The control unit 400 further includes an illumination controller 403 and a scanning controller 405 for controlling the operation of the reading unit 103. The control unit 400 further includes an analog front end (AFE) 407 for detecting the original size of the original A, an image processor 408, and an original size detector 409. The control unit 400 may be achieved by discrete components or one-chip semiconductor products. Examples of the one-chip semiconductor products include a micro-processing unit (MPU), an application specific integrated circuit (ASIC), and a system-on-a-chip (SOC).

The illumination controller 403 is controlled by the CPU 401 to control the operation of turning on and off the illumination units 201a and 201b. The scanning controller 405 is controlled by the CPU 401 to transmit a drive signal to the motor 406, to thereby move the reading unit 103 along the rail 206 in the sub-scanning direction.

The AFE 407 is controlled by the CPU 401 to receive the analog signal from the light receiving unit 204, and subjects the analog signal to sample-hold processing, offset processing, gain processing, or other analog processing. The AFE 407 converts the analog signal subjected to the analog processing into a digital signal, and transmits the signal to the image processor 408. The image processor 408 is controlled by the CPU 401 to subject the digital signal acquired from the AFE 407 to various types of image processing, and generates image data representing the original image read from the original A. The image data is transmitted from the control unit 400 to, for example, an external image forming apparatus or a personal computer.

The original size detector 409 is controlled by the CPU 401 to detect the original edge of the original image based on the image data generated by the image processor 408, and detects the original size of the original A based on the detected original edge. When the platen open/close sensor 107 detects that the platen 104 is in the closed state, the CPU 401 causes the original size detector 409 to start the detection of the original size.

First Embodiment

Figure 5:
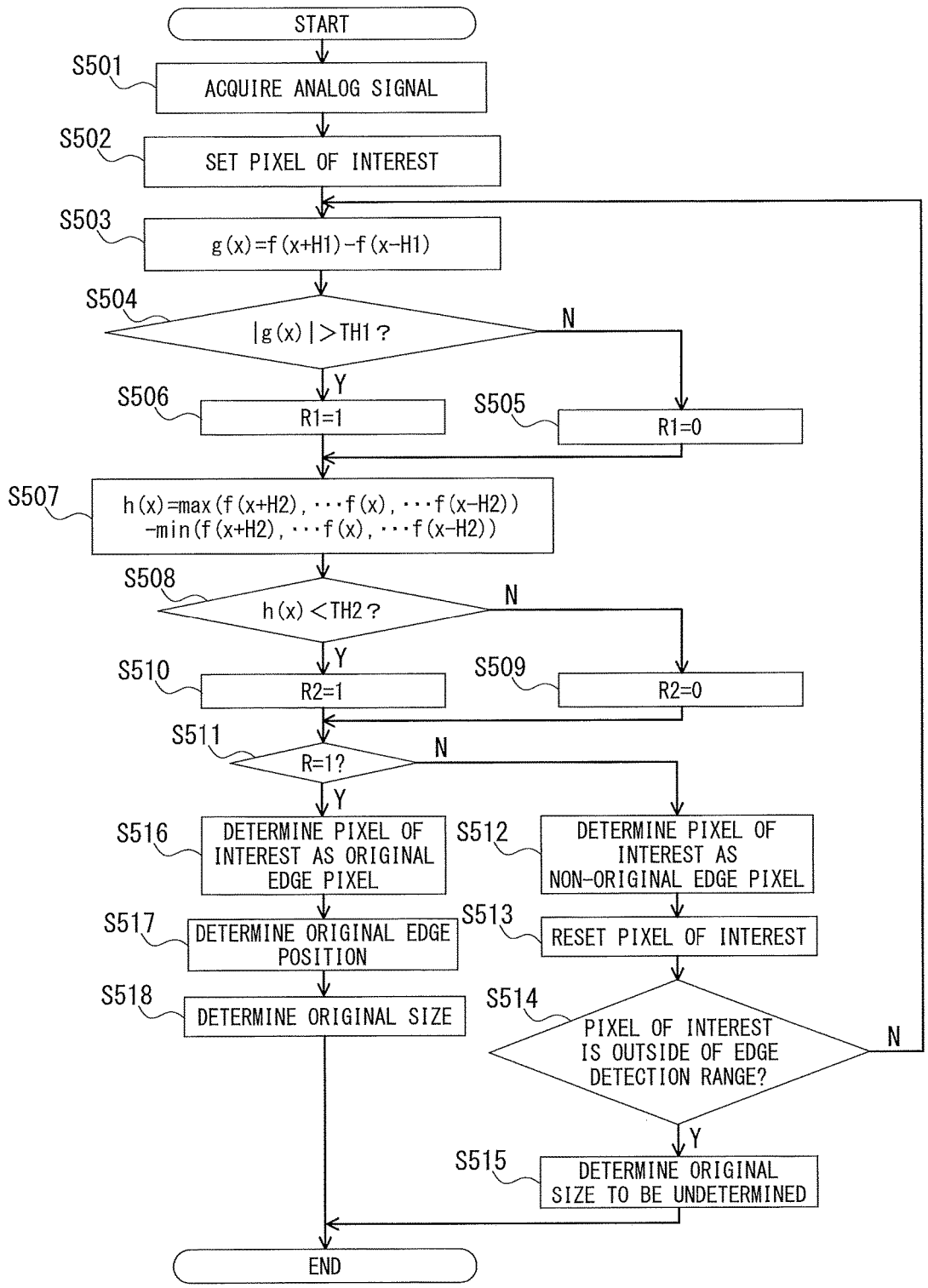
FIG. 5 is a flow chart for illustrating original size detection processing.

FIG. 5 is a flow chart for illustrating original size detection processing to be performed by the image reading apparatus 10. This processing is started when the user opens the platen 104 to place the original A on the original table 102 and then returns the platen 104 to the closed state. The user places the original A so that the corner portion matches with the reference position 303. When the control unit 400 determines that the platen 104 is in the open state based on a result of the detection performed by the platen open/close sensor 107, the control unit 400 moves the reading unit 103 to the original size detection position Y1.

The control unit 400 determines that the platen 104 is returned to the closed state based on the change of the detection result acquired from the platen open/close sensor 107. After the platen 104 is returned to the closed state, the control unit 400 turns on the illumination units 201a and 201b of the reading unit 103, and moves the reading unit 103 from the original size detection position Y1 to the original reading start position Y2. The reading unit 103 performs reading while moving in the sub-scanning direction, to thereby read a plurality of lines that differ in reading positions in the sub-scanning direction to acquire the data thereof. The control unit 400 acquires, from the reading unit 103, an analog signal representing an original image corresponding to one line (Step S501). The control unit 400 subjects the acquired original image corresponding to one line to various types of analog processing, digital conversion processing, and image processing to generate a digital signal. The digital signal is input to the original size detector 409.

The original size detector 409 sets, as a pixel of interest, a pixel on the outermost side in an edge detection range in the main scanning direction based on the acquired digital signal (Step S502). The position of the pixel of interest in the main scanning direction is represented by "x", and a luminance value of the pixel of interest is represented by "f(x)". The luminance value of each pixel is included in the digital signal. The original size detector 409 derives a luminance difference value g(x), which is a difference value between luminance values f(x+H1) and f(x−H1) of pixels located at two positions "x+H1" and "x−H1" that are each separated from the pixel of interest in the main scanning direction by a predetermined first distance H1 (Step S503).

$$g(x)=f(x+H1)-f(x-H1)$$

The original size detector 409 compares the luminance difference value g(x) with a first threshold value TH1 to determine whether or not an absolute value of the luminance difference value g(x) is larger than the first threshold value TH1 (Step S504). The illumination units 201a and 201b obliquely irradiate the original A with light. Therefore, a shadow may be caused at the original edge depending on the thickness of the original A. There is a luminance difference between the original edge and the original pressing member 105 due to this shadow. The processing of Step S503 and Step S504 is performed to detect this luminance difference. Therefore, the first threshold value TH1 is set to a value that enables the luminance value caused by the original edge to be distinguished from the luminance value caused by the original pressing member 105 serving as a background. In the case of the original edge, the absolute value of the luminance difference value g(x) is larger than the first threshold value TH1, and in the case of a part of the original pressing member 105 that is not the original edge, the absolute value of the luminance difference value g(x) is smaller than the first threshold value TH1. The first threshold value TH1 is set considering an original causing less shade and having a small basis weight.

When the absolute value of the luminance difference value g(x) is equal to or smaller than the first threshold value TH1 (Step S504: N), the original size detector 409 sets a first determination result R1 to "0" (Step S505). When the absolute value of the luminance difference value g(x) is larger than the first threshold value TH1 (Step S504: Y), the original size detector 409 sets the first determination result R1 to "1" (Step S506). The processing from Step S503 to Step S506 corresponds to first determination processing.

In the first determination processing, when the pixel of interest is a pixel of the original edge, |g(x)|>TH1 is obtained, and thus R1=1 is obtained. When the pixel of interest is a pixel of the original pressing member 105, |g(x)|<=TH1 is obtained, and thus R1=0 is obtained. When the pixel of interest is at a position of dust, hair, or other dirt on the original table 102, |g(x)|>TH1 and R1=1 are obtained.

After the first determination processing is ended, the original size detector 409 derives a difference value h(x) between the maximum luminance value and the minimum luminance value of pixels within a range of a predetermined second distance H2, which is larger than the first distance H1, in the main scanning direction from the pixel of interest (Step S507). The first distance H1 and the second distance H2 are values obtained through experiments.

$$h(x)=Max-Min$$

Max: max(f(x−2H), ... f(x), ... f(x+H2))
Min: min(f(x−2H), ... , f(x), ... f(x+H2))

The original size detector 409 compares the difference value h(x) with a second threshold value TH2 to determine whether or not the difference value h(x) is smaller than the second threshold value TH2 (Step S508). The shadow caused by the original edge and the shadow caused by dirt often differ in luminance characteristics. The shadow caused by the original edge is a blurred shadow due to the influence of diffusion light of the illumination units 201a and 201b. The shadow caused by dirt is clearer than the shadow caused by the original edge because the dirt itself is often dark. Therefore, the luminance value of the shadow caused by dirt is lower than the luminance value of the shadow caused by the original edge. That is, the difference value h(x) in a range including the shadow caused by the original edge is smaller than the difference value h(x) in a range including the shadow caused by dirt. Therefore, what causes the shadow can be determined by distinguishing the difference values h(x) by an appropriate threshold value. The second threshold value TH2 is set to such a value described above.

When the difference value h(x) is equal to or larger than the second threshold value TH2 (Step S508: N), the original size detector 409 sets a second determination result R2 to "0" (Step S509). When the difference value h(x) is smaller than the second threshold value TH2 (Step S508: Y), the original size detector 409 sets the second determination result R2 to "1" (Step S510). The processing from Step S507 to Step S510 corresponds to second determination processing. In the second determination processing, when the pixel of interest is a pixel of the original edge, h(x)<TH2 is obtained, and thus R2=1 is obtained. When the pixel of interest is a pixel of dirt, h(x)≥TH2 is obtained, and thus R2=0 is obtained.

The first determination processing and the second determination processing differ in range from the pixel of interest. As described above, the second distance H2 is larger than the first distance H1. If the second distance H2 and the first distance H1 are the same, the shadow caused by the original edge and the shadow caused by dirt cannot be distinguished from each other through determination performed by combining the first determination result R1 and the second determination result R2. This is because the luminance value of the shadow caused by dirt does not abruptly change, but a part that gently changes always appears. Therefore, the same range from the pixel of interest cannot be used for the first determination processing and the second determination processing. When the second distance H2 is set to be larger than the first distance H1, the range for deriving the difference value h(x) can include even a part having a low luminance value due to the shadow caused by dirt, and thus the shadow caused by the original edge and the shadow caused by dirt can be distinguished from each other.

The original size detector 409 determines whether or not a product (R=R1·R2) of the first determination result R1 and the second determination result R2 is "1" (Step S511). When the pixel of interest is a pixel of the original edge, R=1·1=1 is obtained. When the pixel of interest is a pixel of dirt, R=1·0=0 is obtained.

When the product of the first determination result R1 and the second determination result R2 is "0" (Step S511: N), the original size detector 409 determines that the pixel of interest is a pixel of a non-original edge (Step S512). The original size detector 409 that has determined that the pixel of interest is a pixel of the non-original edge resets the pixel of interest to a pixel on an inner side of the pixel of interest in the main scanning direction by one pixel as a new pixel of interest (Step S513). The "inner side in the main scanning direction by one pixel" refers to a position closer to the direction of the sub-scanning original size index 302 by one pixel. The original size detector 409 determines whether or not the reset position of the pixel of interest in the main scanning direction is outside of the edge detection range in the main scanning direction (Step S514). When the reset position is not outside of the edge detection range (Step S514: N), the original size detector 409 repeats the processing of Step S503 and the subsequent steps. When the reset position is outside of the edge detection range (Step S514: Y), the original size detector 409 determines that the original A is not placed at a position on the original table 102 at which the original size can be detected, and ends the processing (Step S515).

When the product of the first determination result R1 and the second determination result R2 is "1" (Step S511: Y), the original size detector 409 determines that the pixel of interest is a pixel of the original edge (Step S516). The original size detector 409 determines the pixel of the original edge as an original edge position in the main scanning direction (Step S517). The original size detector 409 determines the original size based on the original edge position, and ends the original size detection processing (Step S518).

The original A is placed so that its corner portion matches with the reference position 303, and hence a distance from the sub-scanning original size index 302 to the original edge position corresponds to the size of the original A in the main scanning direction. The original size detector 409 determines the original size from the size of the original A in the main scanning direction assuming that the original A has an original size in conformity with the standard. When the size of the original A in the main scanning direction is not the size in conformity with the standard, the original size detector 409 determines that a non-standard original A is placed. In this case, the original size detector 409 determines a closest standard size that is larger than the size of the original A in the main scanning direction as the original size. In this manner, the non-standard original A can be copied to a sheet that is larger in size than the original A without lacking the original image.

In the processing of detecting the original size as described above, the image reading apparatus 10 detects the original edge from the outer side to the inner side in the main scanning direction (toward the sub-scanning original size index 302), and determines the original size after the original edge is detected. Therefore, the original size can be detected without falsely determining dirt or the original image of the original A as the original edge. As described above, the image reading apparatus 10 can detect the original size with high accuracy while the influence by dirt is suppressed.

Second Embodiment

Figure 6:
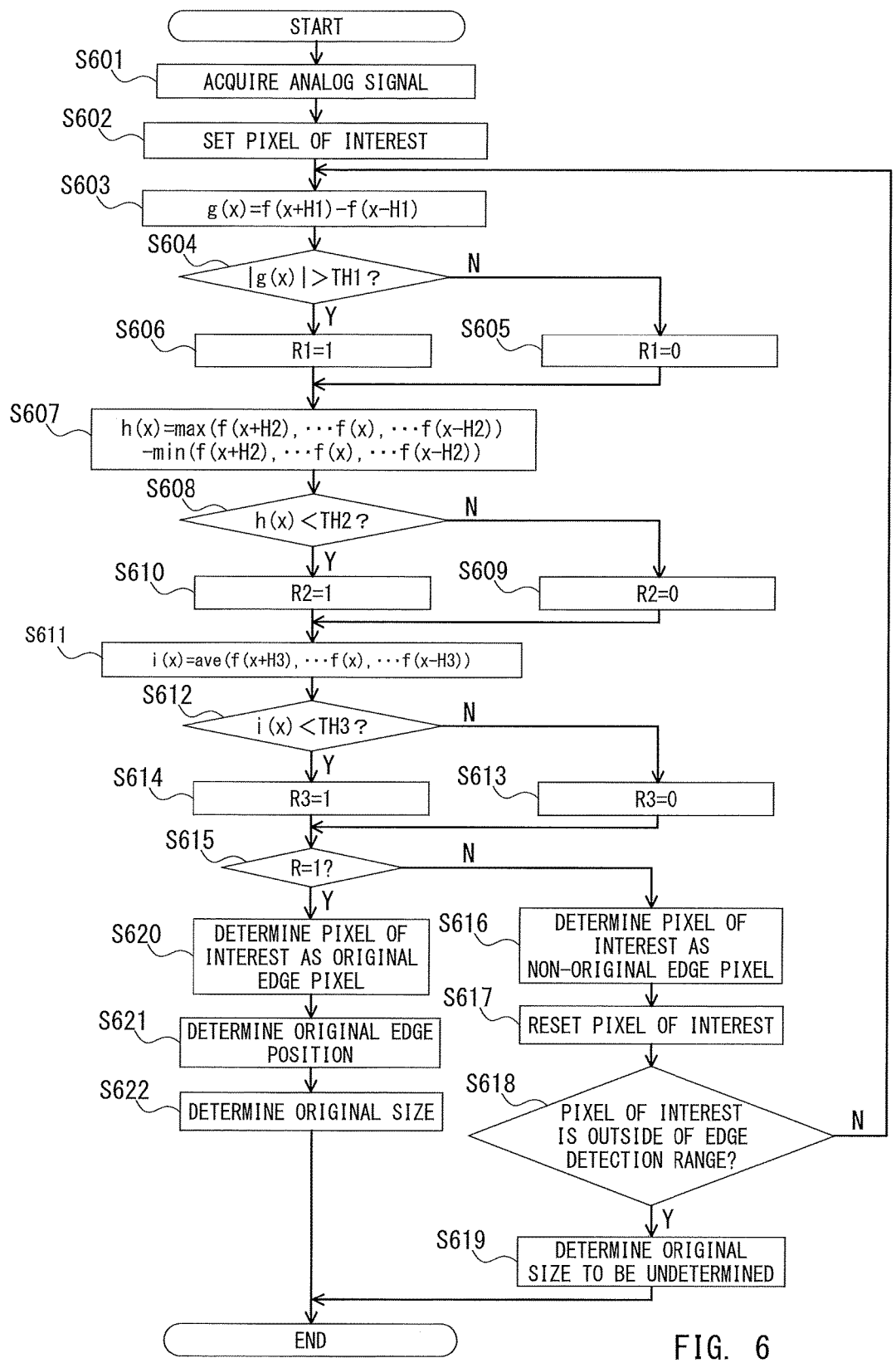
FIG. 6 is a flow chart for illustrating another mode of the original size detection processing.

FIG. 6 is a flow chart for illustrating another mode of the original size detection processing to be performed by the image reading apparatus 10. This processing is processing of detecting the original size when the original A is a black original having no margin.

Similarly to the processing of the first embodiment, this processing is started when the user opens the platen 104 to place the original A on the original table 102 and then returns the platen 104 to the closed state. The user places the original A so that the corner portion matches with the reference position 303. When the control unit 400 determines that the platen 104 is in the open state based on a result of the detection performed by the platen open/close sensor 107, the control unit 400 moves the reading unit 103 to the original size detection position Y1. The processing from Step S601 to Step S610 is similar to the processing from Step S501 to Step S510 of FIG. 5, and hence description thereof is omitted herein.

After the second determination processing is ended, the original size detector 409 derives an average value i(x) of luminance values of pixels within a range of a predetermined third distance H3 in the main scanning direction from the pixel of interest (Step S611)

$$i(x)=\text{ave}(f(x+3H), \ldots, f(x), \ldots f(x-H3))$$

The original size detector 409 compares the average value i(x) with a third threshold value TH3 to determine whether or not the average value i(x) is smaller than the third threshold value TH3 (Step S612). When the original A is a black original having no margin, the average value of the luminance values of the pixels within a predetermined range in the main scanning direction in the vicinity of the original edge is smaller than the average value in a case in which the luminance value caused by dirt is included. This is because the average value includes many luminance values of the original edge of the black original. Dirt is often small or often has a streak shape, and hence, when the average of the luminance values is calculated in a range that is large to some extent, only small influence is caused by the dirt, and the average includes many luminance values caused by the white color of the original pressing member 105. Therefore, the average value i(x) is increased when the luminance value caused by the dirt is included. What causes the shadow can be determined by distinguishing such average values i(x) by an appropriate threshold value. The third threshold value TH3 is obtained through experiments and is set to such a value described above.

When the average value i(x) is equal to or larger than the third threshold value TH3 (Step S612: N), the original size detector 409 sets a third determination result R3 to "0" (Step S609). When the average value i(x) is smaller than the third threshold value TH3 (Step S612: Y), the original size detector 409 sets the third determination result R3 to "1" (Step S614). The processing from Step S611 to Step S614 corresponds to third determination processing. In the third determination processing, when the pixel of interest is a pixel of the original edge of the black original, x(i)<TH3 is obtained, and thus R3=1 is obtained. When the pixel of interest is a pixel of dirt, i(x)≥TH3 is obtained, and thus R3=0 is obtained.

The original size detector 409 determines whether or not a sum (R=(R1·R2)+R3) of the product of the first determination result R1 and the second determination result R2 and the third determination result R3 is "1" (Step S615). When the pixel of interest is a pixel of the original edge of an original having a margin, R=(1·1)+0=1 is obtained. When the pixel of interest is a pixel of dirt, R=(1·0)+0=0 is obtained. When the pixel of interest is a pixel of the original edge of a black original having no margin, R=(1·0)+1=1 is obtained. The processing from Step S616 to Step S622 based on the determination result of Step S615 is similar to the processing from Step S512 to Step S518 of FIG. 5, and hence description thereof is omitted herein.

Figure 7:
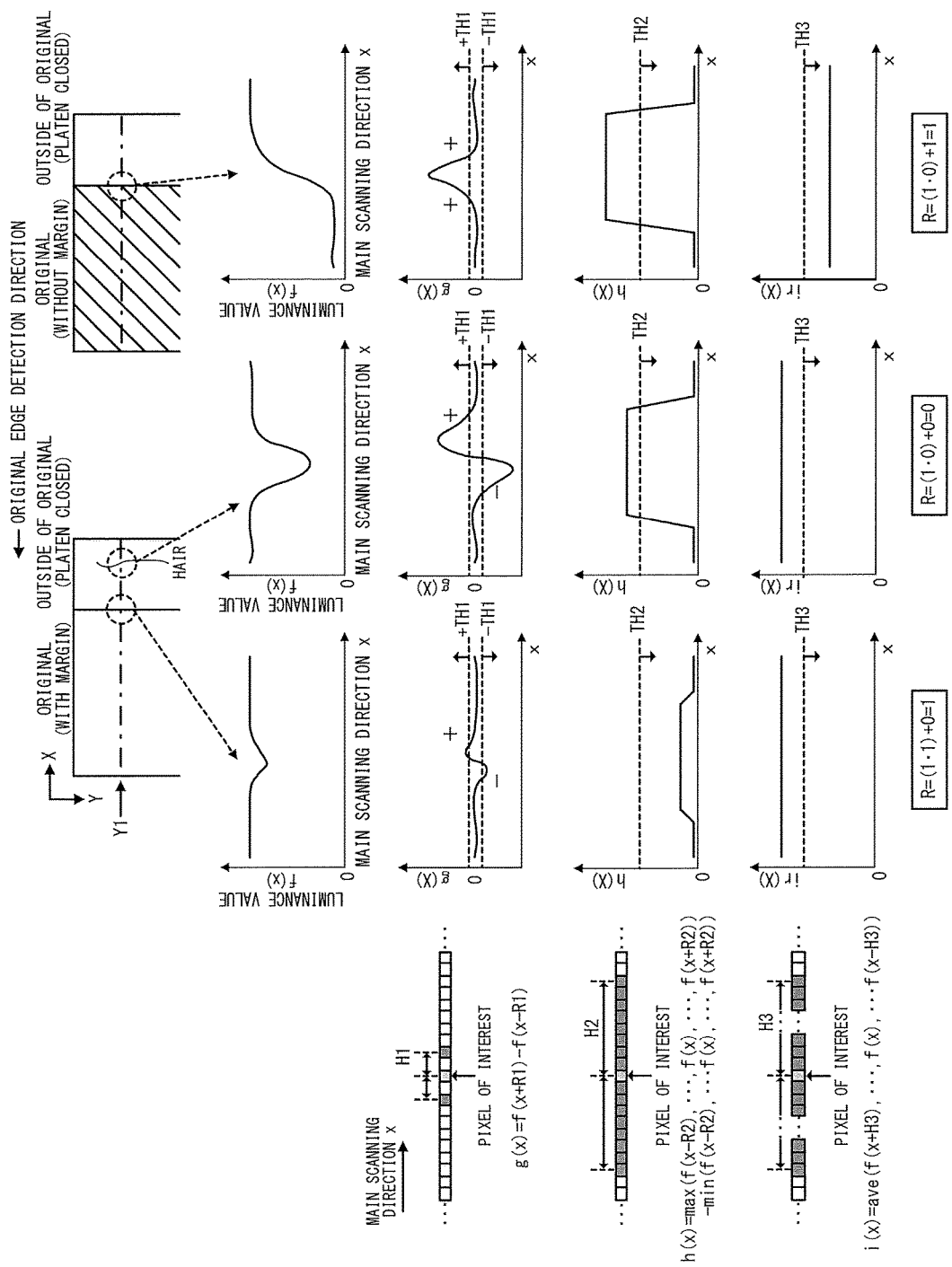
FIG. 7 is an explanatory diagram for illustrating first determination processing to third determination processing.

FIG. 7 is an explanatory diagram for illustrating the first determination processing to third determination processing in the original size detection processing of the second embodiment. In FIG. 7, there are shown graphs of the luminance difference value g(x), the difference value h(x), and the average value i(x), which are derived when the pixel of interest is a pixel of the original edge of an original having a margin, a pixel of dirt, and a pixel of the original edge of a black original having no margin. The x axis represents a position (pixel) in the main scanning direction, and the y axis represents each of the luminance value, the luminance difference value g(x), the difference value h(x), and the average value i(x). With the first determination processing and the second determination processing, the original edge of an original having a margin and dirt are distinguished from each other. With the third determination processing, the original edge of a black original having no margin and dirt are distinguished from each other. In FIG. 7, the second distance H2 and the third distance H3 have the same value.

As described above, in the original size detection processing of the second embodiment, in addition to an effect similar to that of the first embodiment, the original size can be detected with high accuracy while the influence by dirt is suppressed even when the original A is a black original having no margin.

Third Embodiment

Figure 8:
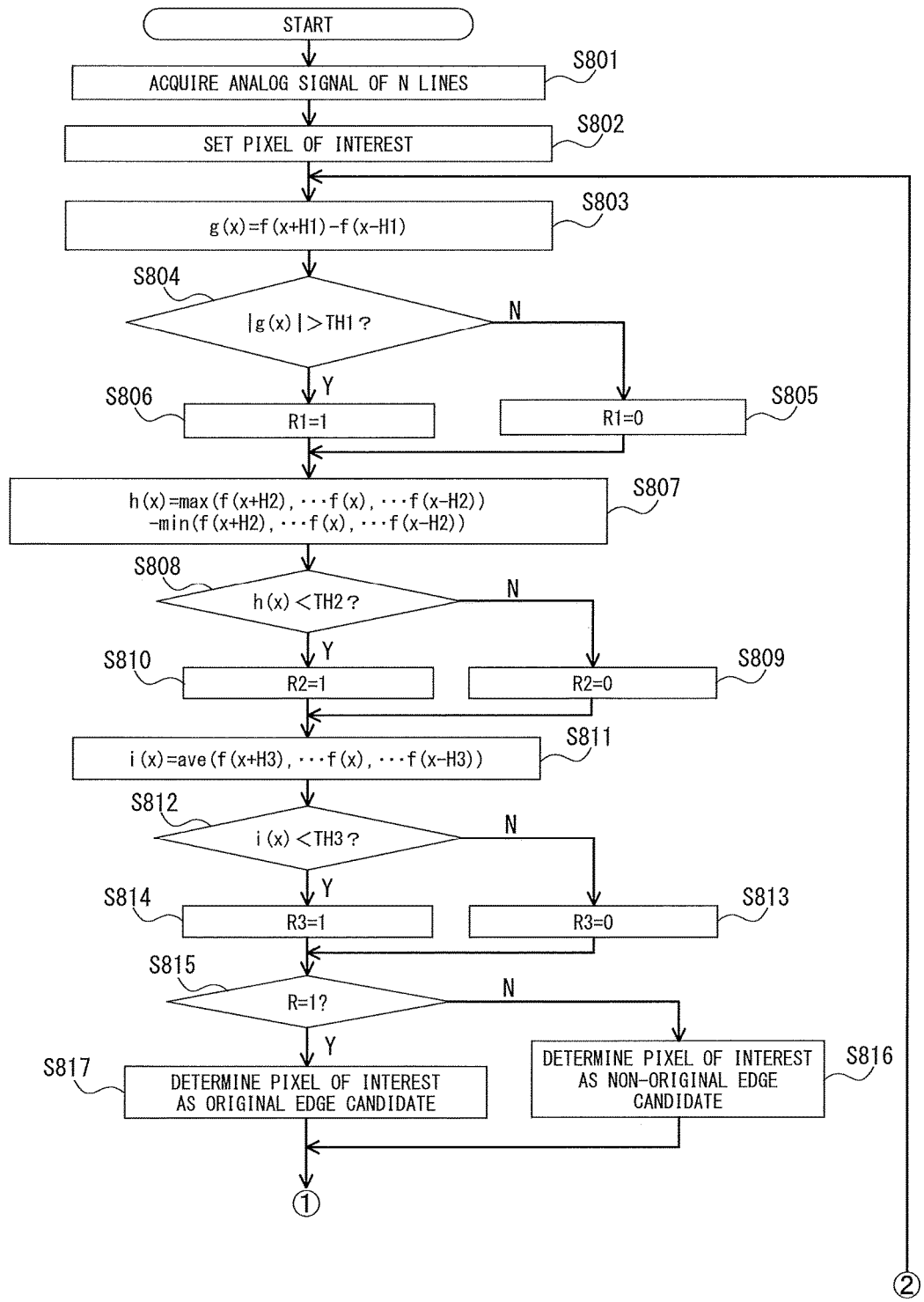
FIG. 8 is a flow chart for illustrating another mode of the original size detection processing.
Figure 9:
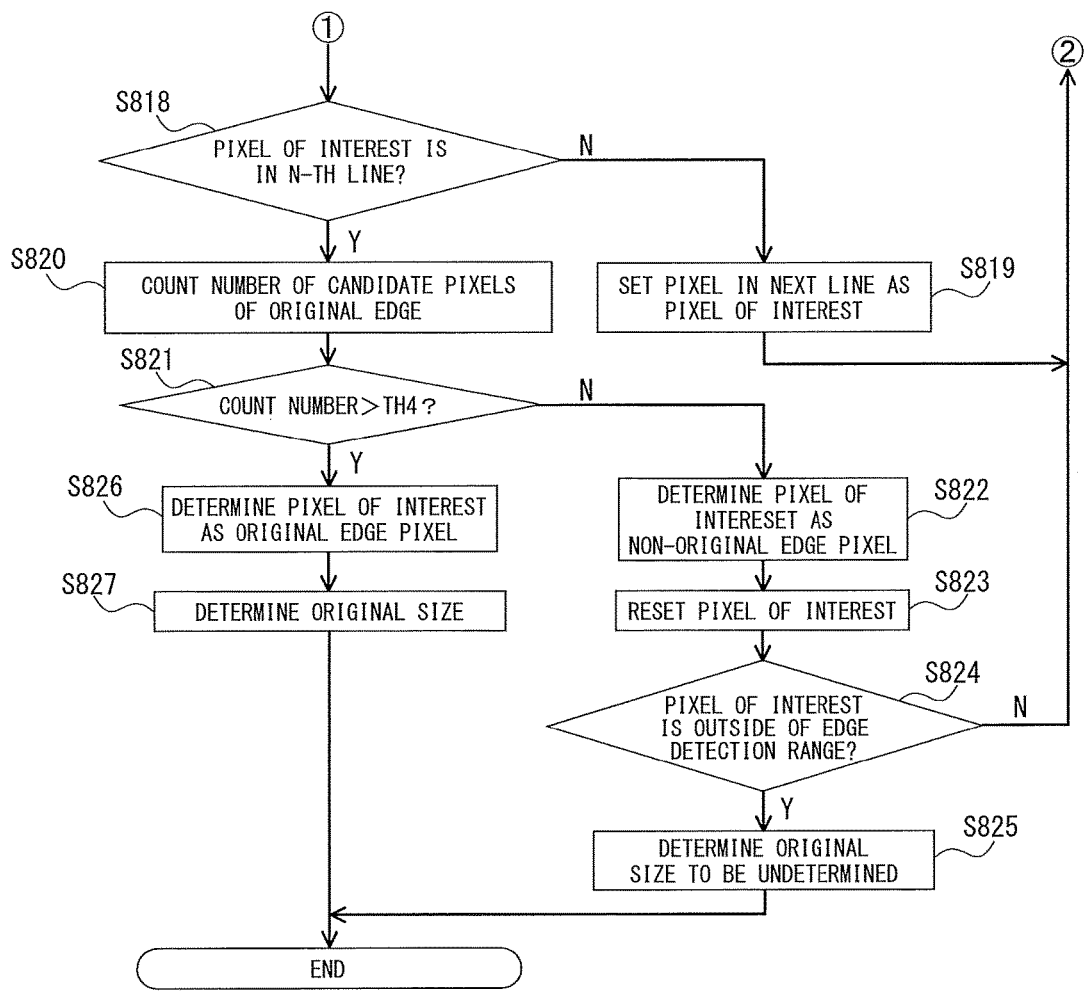
FIG. 9 is a flow chart for illustrating another mode of the original size detection processing.

FIG. 8 and FIG. 9 are flow charts for illustrating another mode of the original size detection processing to be performed by the image reading apparatus 10. In this processing, the reading unit 103 reads the original A for a plurality of lines while the reading unit 103 moves from the original size detection position Y1 to the original reading start position Y2. Along therewith, the control unit 400 executes the processing of the second embodiment a plurality of times for each piece of image data corresponding to the plurality of lines. In such processing, for example, even when dirt is falsely detected as the original edge in the case of one line, the dirt rarely continues in the sub-scanning direction at the same position in the main scanning position, and hence the possibility of false detection of the original edge due to the dirt can be reduced. In the case of the original edge, the original edge is detected in a linear shape in the sub-scanning direction. Therefore, the image reading apparatus 10 can detect the original edge with high accuracy.

Similarly to the processing of the first embodiment, this processing is started when the user opens the platen 104 to place the original A on the original table 102 and then returns the platen 104 to the closed state. The user places the original A so that the corner portion matches with the reference position 303. When the control unit 400 determines that the platen 104 is in the open state based on the result of the detection performed by the platen open/close sensor 107, the reading unit 103 starts to move to the original size detection position Y1. In this manner, the reading unit 103 reads the original A for a plurality of lines in the main scanning direction. The control unit 400 acquires analog signals representing original images corresponding to the plurality of lines (N lines, where N is an integer of 2 or more) from the reading unit 103 (Step S801). The control unit 400 subjects the acquired original image corresponding to N lines to various types of analog processing, digital conversion processing, and image processing to generate a digital signal. The digital signal is input to the original size detector 409.

The original size detector 409 sets, as a pixel of interest, a pixel on the outermost side in the edge detection range in the main scanning direction of the first line (original size detection position Y1) from the acquired digital signal (Step S802). The original size detector 409 that has set the pixel of interest performs processing similar to that of Step S603 to Step S615 of FIG. 6 (first determination processing to third determination processing) (Step S803 to Step S815). In this manner, the original size detector 409 determines whether or not the sum (R=(R1·R2)+R3) of the product of the first determination result R1 and the second determination result R2 and the third determination result R3 is "1".

When the sum of the product of the first determination result R1 and the second determination result R2 and the third determination result R3 is "0" (Step S815: N), the original size detector 409 determines that the pixel of interest is a candidate pixel of the non-original edge (Step S816). When the sum of the product of the first determination result R1 and the second determination result R2 and the third determination result R3 is "1" (Step S815: Y), the original size detector 409 determines that the pixel of interest is a candidate pixel of the original edge (Step S817).

The original size detector 409 determines whether or not the pixel of interest is a pixel in the N-th line (Step S818). That is, the original size detector 409 determines whether or not the first determination processing to the third determination processing are performed to the pixel at the same position in the main scanning direction in each of the N lines. When the pixel of interest is not a pixel in the N-th line (Step S818: N), the original size detector 409 sets a pixel at the same position in the main scanning direction as the pixel of interest in the next line as a new pixel of interest to be subjected to the processing next (Step S819). The original size detector 409 that has set the new pixel of interest executes the processing of Step S803 and the subsequent steps again.

When the pixel of interest is a pixel in the N-th line (Step S818: Y), the original size detector 409 counts the number of pixels that are determined as the candidate pixel of the original edge among the pixels at the same position in the main scanning direction as the pixel of interest in the other lines (Step S820). The original size detector 409 determines whether or not the count number of candidate pixels of the original edge is larger than a fourth threshold value TH4 (Step S821). With such processing, for example, even when dirt that causes false detection as the original edge in the case of one line appears, the original edge can be detected with high accuracy while the influence by the dirt is suppressed. The fourth threshold value is a value obtained through experiments.

When the count number is equal to or smaller than the fourth threshold value TH4 (Step S821: N), the original size detector 409 determines that the position of the pixel of interest in the main scanning direction is the non-original edge (Step S822). The original size detector 409 resets the pixel of interest to a pixel on the inner side of the pixel of interest in the main scanning direction by one pixel as a new pixel of interest (Step S823). The original size detector 409 determines whether or not the reset position of the pixel of interest in the main scanning direction is outside of the edge detection range in the main scanning direction (Step S824).

When the reset position is not outside of the edge detection range (Step S824: N), the original size detector 409 repeats the processing of Step S803 and the subsequent steps. When the reset position is outside of the edge detection range (Step S824: Y), the original size detector 409 determines that the original A is not placed at a position on the original table 102 at which the original size can be detected, and ends the processing (Step S825).

When the count number is larger than the fourth threshold value TH4 (Step S821: Y), the original size detector 409 determines the position of the pixel of interest in the main scanning direction as the original edge (Step S826). The original size detector 409 determines the original size based on the original edge, and ends the original size detection processing (Step S827).

Figure 10:
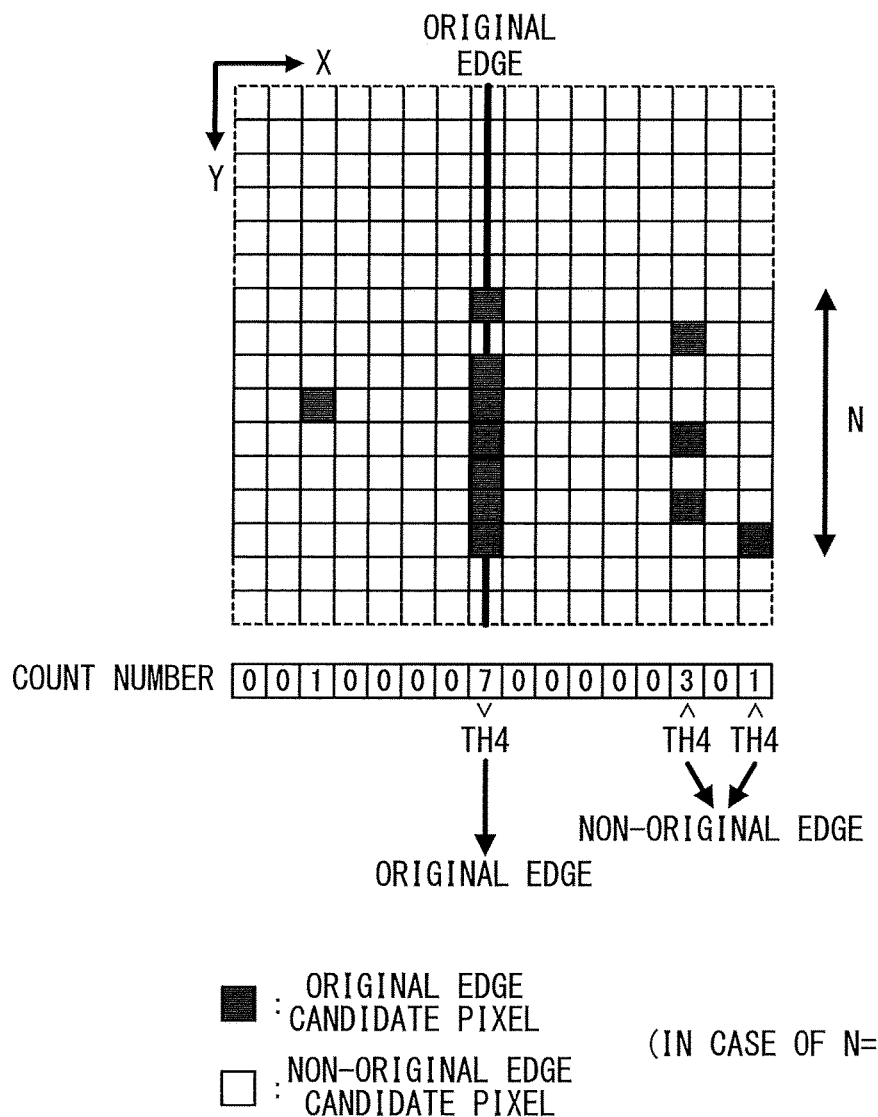
FIG. 10 is an explanatory diagram for illustrating original edge detection processing that is based on a count number of candidate pixels of an original edge.

FIG. 10 is an explanatory diagram for illustrating the original edge detection processing (processing from Step S820 to Step S826) that is based on the count number of candidate pixels of the original edge. The candidate pixel of the original edge is determined by the processing up to Step S817 in the direction of the arrow X being the main scanning direction. The processing up to Step S817 is repeated for N lines so that it can be determined whether or not the pixel at the same position in the main scanning direction is the candidate pixel of the original edge and at least a predetermined number of candidate pixels are present in the direction of the arrow Y being the sub-scanning direction. The predetermined number corresponds to the fourth threshold value TH4. In the example of FIG. 10, there are seven candidate pixels of the original edge in the eighth pixels from the left end in the main scanning direction. Therefore, it is determined that the eighth pixels from the left end in the main scanning direction are the original edge. The candidate pixels of the original edge are present in the third pixel, the fourteenth pixels, and the sixteenth pixel from the left end in the main scanning direction, but the number of the candidate pixels is smaller than the predetermined number (fourth threshold value TH4), and hence the candidate pixels are not determined as the original edge. As described above, in the third embodiment, even when dirt that may cause false detection in one-line processing appears, the original edge can be detected with high accuracy while the influence by the dirt can be suppressed.

Fourth Embodiment

Figure 11:
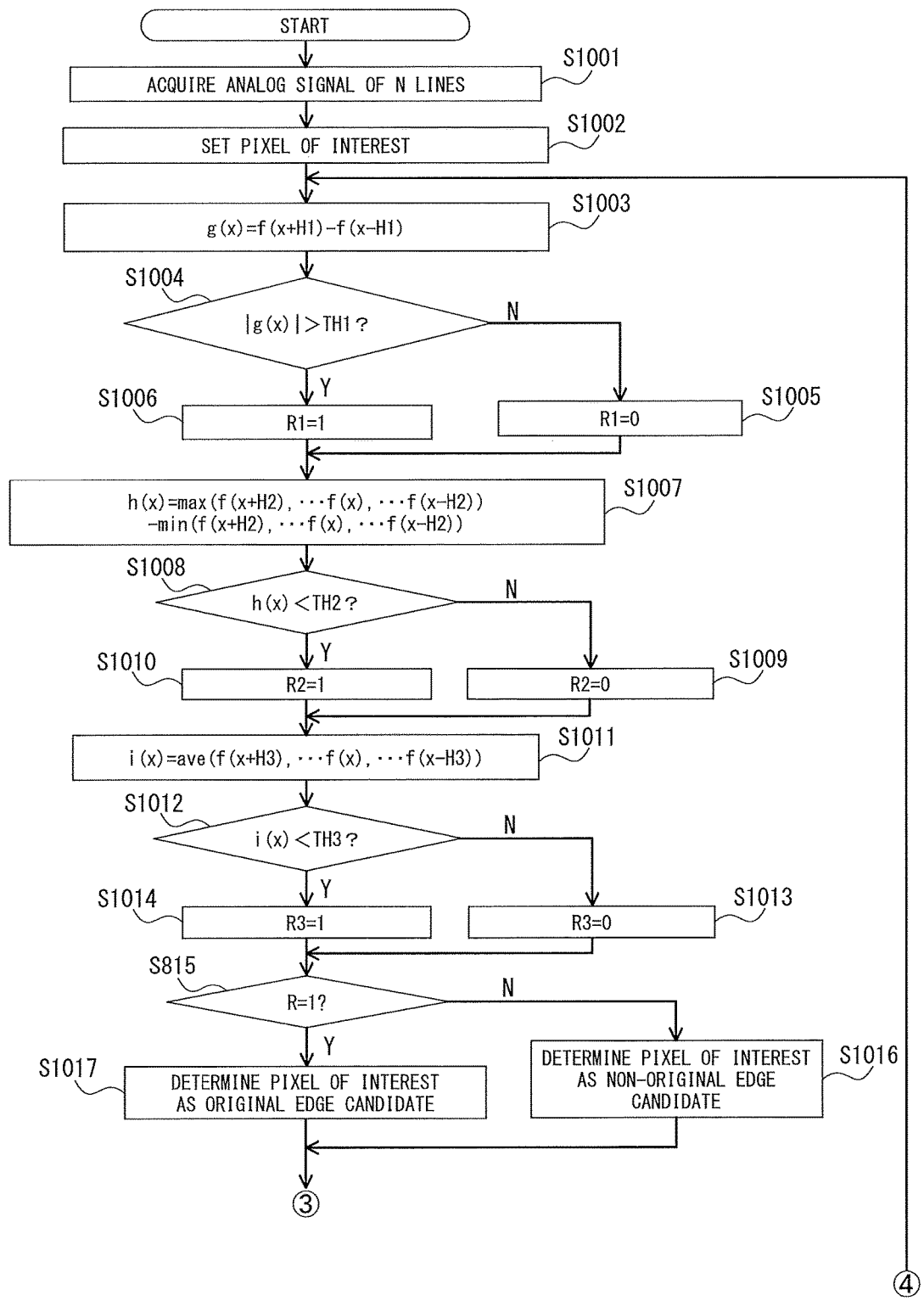
FIG. 11 is a flow chart for illustrating another mode of the original size detection processing.
Figure 12:
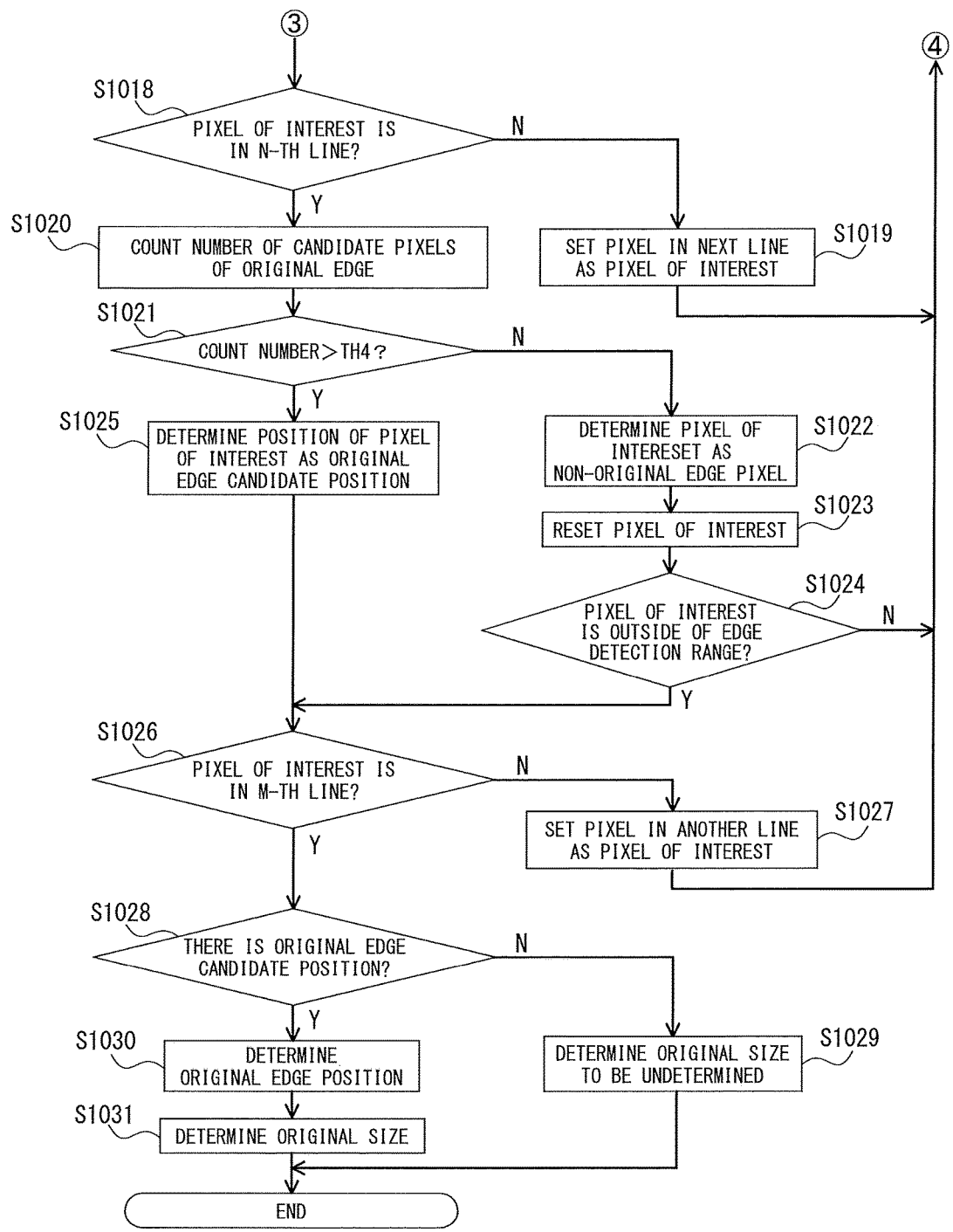
FIG. 12 is a flow chart for illustrating another mode of the original size detection processing.

FIG. 11 and FIG. 12 are flow charts for illustrating another mode of the original size detection processing to be performed by the image reading apparatus 10. In this processing, the reading unit 103 reads the original A for a plurality of lines while the reading unit 103 moves from the original size detection position Y1 to the original reading start position Y2. In a fourth embodiment of the present invention, the reading unit 103 reads the original image for a plurality of lines separated from each other in the sub-scanning direction. Along therewith, the control unit 400 executes the processing of the second embodiment a plurality of times for each piece of image data corresponding to the plurality of lines. In such processing, for example, even when there is dirt that may cause false detection in the processing of the third embodiment, the dirt rarely continues linearly at a position separated in the sub-scanning direction at the same position in the main scanning position, and hence the possibility of false detection of the original edge due to the dirt can be reduced. In the case of the original edge, the original edge is detected in a linear shape in the sub-scanning direction. Therefore, the image reading apparatus 10 can detect the original edge with high accuracy.

Similarly to the processing of the first embodiment, this processing is started when the user opens the platen 104 to place the original A on the original table 102 and then returns the platen 104 to the closed state. The user places the original A so that the corner portion matches with the reference position 303. When the control unit 400 determines that the platen 104 is in the open state based on the result of the detection performed by the platen open/close sensor 107, the reading unit 103 starts to move to the original size detection position Y1. In this manner, the reading unit 103 reads the original A for a plurality of lines in the main scanning direction at M positions separated from each other in the sub-scanning direction. The control unit 400 acquires analog signals representing original images corresponding to the plurality of lines (M lines, where M is an integer of 2 or more; M lines are less than the N lines in the third embodiment) from the reading unit 103 (Step S1001). The control unit 400 subjects the acquired original image corresponding to M lines to various types of analog processing, digital conversion processing, and image processing to generate a digital signal. The digital signal is input to the original size detector 409.

The original size detector 409 sets, as a pixel of interest, a pixel on the outermost side in the edge detection range in the main scanning direction of the first line (original size detection position Y1) from the acquired digital signal (Step S1002). The original size detector 409 that has set the pixel of interest performs processing similar to that of Step S803 to Step S824 of FIG. 8 and FIG. 9 (Step S1003 to Step S1024).

When the count number is larger than the fourth threshold value TH4 (Step S1021: Y), the original size detector 409 determines the position of the pixel of interest in the main scanning direction as an original edge candidate position (Step S1025). The original size detector 409 determines whether or not the pixel of interest is in the M-th line (Step S1026). That is, the original size detector 409 determines whether or not the processing up to Step S1026 is ended at all of the positions separated in the sub-scanning direction.

When the pixel of interest is not in the M-th line (Step S1026: N), the original size detector 409 resets the pixel of interest to a pixel on the outermost side in the edge detection range in the main scanning direction of another line separated in the sub-scanning direction as a new pixel of interest (Step S1027). The original size detector 409 that has reset the pixel of interest repeats the processing of Step S1003 and the subsequent steps.

When the pixel of interest is in the M-th line (Step S1026: Y), the original size detector 409 determines the presence or absence of the original edge candidate position from the results of the processing for the M lines (Step S1028). When there is no original edge candidate position (Step S1028: N), the original size detector 409 determines that the original A is not placed at a position on the original table 102 at which the original size can be detected, and hence ends the processing (Step S1029). When there is an original edge candidate position (Step S1028: Y), the original size detector 409 determines the original edge position based on the original edge candidate position (Step S1030). The original size detector 409 determines the original size based on the original edge position, and ends the original size detection processing (Step S1031).

Figure 13:
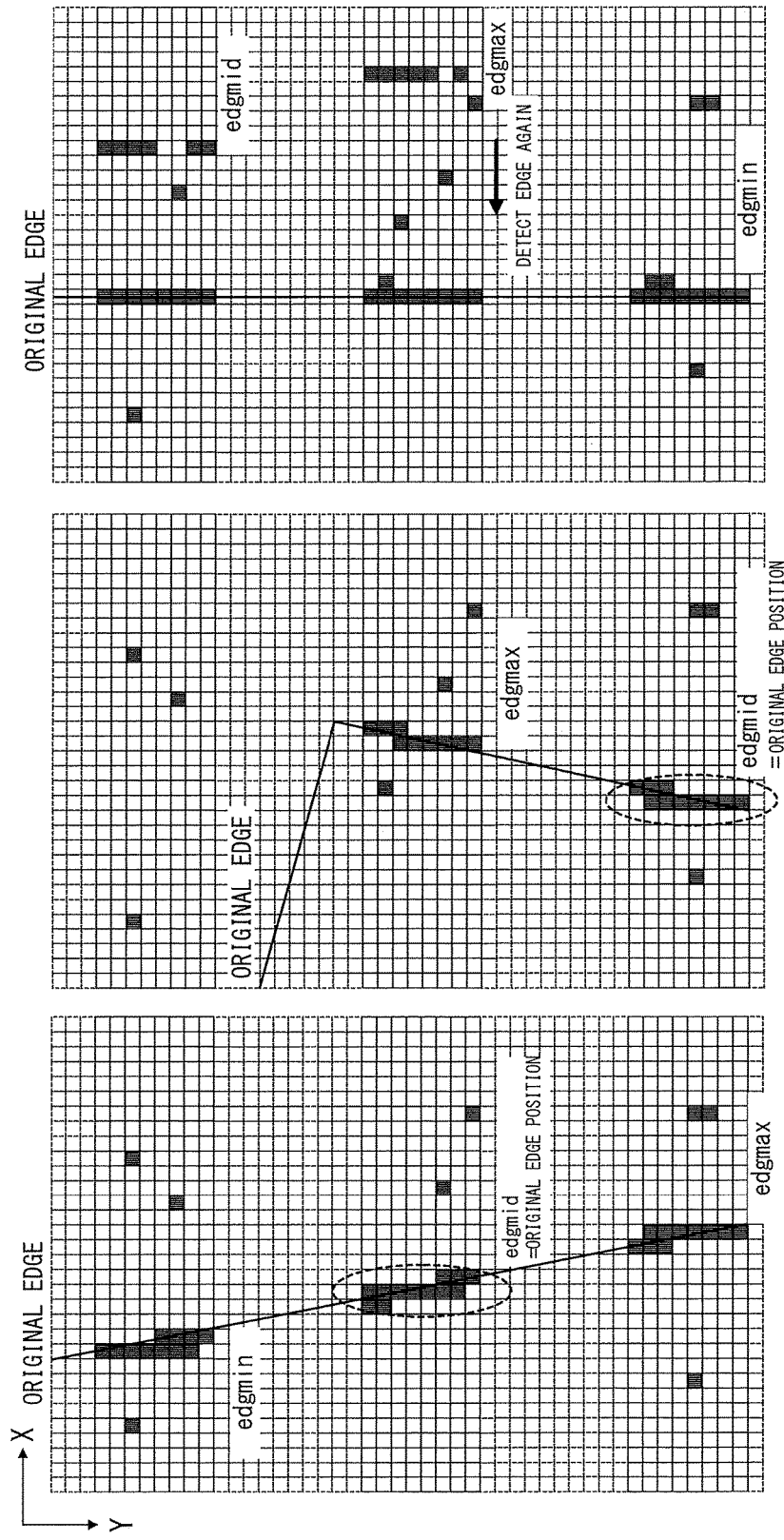
FIG. 13 is an explanatory diagram for illustrating processing of determining an original edge position.

FIG. 13 is an explanatory diagram for illustrating processing of determining the original edge position of Step S1030. In the following description, M is set to 3, and the original size detection processing is performed based on lines separated from each other at equal intervals in the sub-scanning direction.

The original size detector 409 performs processing while setting the original edge candidate positions detected in the respective three lines as edgmax, edgmid, and edgmin in descending order in the main scanning direction (arrow X direction). In this case, the "descending order in the main scanning direction" is the descending order in the distance from the reference position 303. The original size detector 409 calculates a difference diff=(edgmax−edgmid)−(edgmid−edgmin) of the respective intervals of the original edge candidate positions. The value of the difference diff differs depending on how the original A is placed. Therefore, the original size detector 409 determines the original edge position based on the value of the difference diff.

In general, the original edge has a straight line, and hence when the original A is placed on the original table 102 so that its corner portion matches with the reference position 303, or even when the original A is not properly placed but placed obliquely on the original table 102, the difference diff is a very small value. When the original is placed so that its corner portion matches with the reference position 303, the original edge candidate positions in the respective three lines are at the same position in the main scanning direction, and hence the difference diff is a very small value. When the original is obliquely placed, the original edge candidate positions of the respective three lines have equal intervals in the sub-scanning direction, and hence the original edge candidate positions also have equal intervals in the main scanning direction based on a similarity relationship. Therefore, the difference diff is a very small value. Considering a case in which the original edge slightly has irregularities, the original size detector 409 determines that the original edge is correctly detected when diff<OFST1 is satisfied, and sets the position of edgmid as the original edge position. The offset value OFST1 is a relatively small value.

The original A may not be placed at one of the detection positions at which the original edge candidate position is detected. For example, the original A may be placed so that one side of the original is not in contact with the main scanning original size index 301. In this case, the difference diff is a very large value. This is because the original edge cannot be detected at a detection position at which the original A is not placed, and hence edgmin is a very small value. Therefore, when diff>OSFT2 is satisfied, the original size detector 409 determines that the original A is not placed at one of the detection positions, and sets the detection result at the remaining two positions, that is, the position of edgmid as the original edge position. The offset value OFST2 is a relatively large value. The offset values OFST1 and OFST2 are values obtained through experiments.

When the original edge candidate position is detected, the value of the difference diff tends to have neither a small value nor a large value. Therefore, when OFST1≤diff≤OFST2 is satisfied, the original size detector 409 determines that there is an original edge detection position at which false detection is occurring, and detects a new original edge candidate position at a position at which edgmax is detected. The original size detector 409 calculates the difference diff again based on the new original edge candidate position and the remaining two original edge candidate positions to determine the original edge position.

In the first to fourth embodiments described above, description is mainly given of a case in which the original edge is detected in the main scanning direction, but the original size can be similarly detected even by detecting the original edge in the sub-scanning direction. According to the first to fourth embodiments, the original size can be detected with high accuracy while the influence by dirt is suppressed.

Copying Processing

Figure 14:
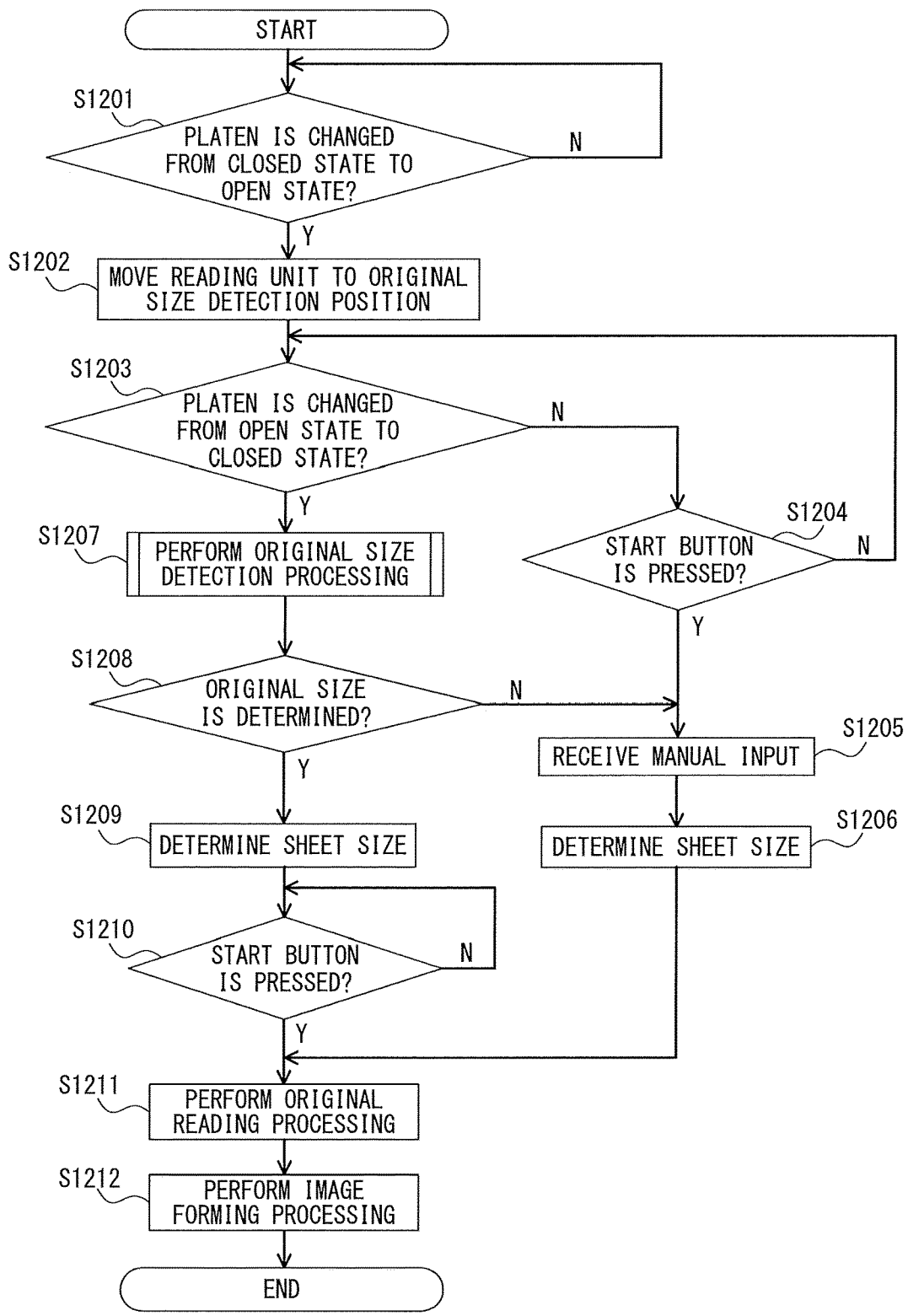
FIG. 14 is a flow chart for illustrating copying processing.

FIG. 14 is a flow chart for illustrating copying processing using the image reading apparatus 10. When the copying processing is performed, the image reading apparatus 10 is connected to an image forming apparatus so that the image data is input to the image forming apparatus. The image forming apparatus forms the original image read by the image reading apparatus 10 onto the sheet based on the image data.

The control unit 400 determines whether or not the platen 104 is changed from the closed state to the open state based on the result of the detection performed by the platen open/close sensor 107 (Step S1201). When the platen 104 is changed to the open state (Step S1201: Y), the control unit 400 moves the reading unit 103 to the original size detection position Y1 (Step S1202). At this time, the user places the original A onto the original table 102. After that, the control unit 400 determines whether or not the platen 104 is changed from the open state to the closed state (Step S1203).

When the platen 104 is not changed to the closed state (Step S1203: N), the control unit 400 determines whether or not a start button (not shown) is pressed (Step S1204). When the start button is not pressed (Step S1204: N), the control unit 400 performs the processing of Step S1203 again. When the start button is pressed (Step S1204: Y), the control unit 400 urges the user to input the original size (Step S1205). In this case, the control unit 400 does not detect the size of the original A, and hence waits for direct input from the user. The control unit 400 displays, for example, a screen for inputting the original size on a display (not shown) to urge the user to input the original size. The original size is input by an input device (not shown). When the original size is input, the control unit 400 determines the size of the sheet to be used for copying based on the input original size (Step S1206). The control unit 400 that has determined the sheet size performs the processing of reading the original image by the image reading apparatus 10 (Step S1211).

When the platen 104 is changed to the closed state (Step S1203: Y), the control unit 400 performs the original size detection processing of any one of the first to fourth embodiments described above (Step S1207). The control unit 400 determines whether or not the original size is determined after the original size detection processing is performed (Step S1208). When the original size is not determined (Step S1208: N), the control unit 400 performs the processing of Step S1205 and Step S1206 to determine the size of the sheet to be used for copying based on the original size input by the user. When the original size is determined (Step S1208: Y), the control unit 400 determines the size of the sheet to be used for copying based on the original size (Step S1209). The control unit 400 that has determined the sheet size waits for the pressing of the start button (Step S1210). When the start button is pressed (Step S1210: Y), the control unit 400 performs the processing of reading the original image by the image reading apparatus 10 (Step S1211).

With the processing of reading the original image by the image reading apparatus 10, the control unit 400 generates image data representing the original image of the original A. The control unit 400 transmits the generated image data and the information representing the determined size of the sheet to the image forming apparatus. The image forming apparatus receives the image data and the information representing the determined size of the sheet to form an image that is based on the image data onto a sheet that is based on the sheet size (Step S1212).

With the above-mentioned processing, the copying processing is performed to form an original image onto a sheet having a size corresponding to the original size of the original A. The original size is accurately detected, and hence the size of the sheet to which the original image is copied is appropriately determined, and the original image is copied without lack.

Embodiment(s) of the present invention can also be realized by a computer of a system or apparatus that includes one or more circuits (e.g., application specific integrated circuit (ASIC) or SOC (system on a chip)) for performing the functions of one or more of the above-described embodiment(s).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-244048, filed Dec. 16, 2016 which is hereby incorporated by reference herein in its entirety.

What is claimed is:

1. An image reading apparatus, comprising:
an original table on which an original is to be placed;
an original presser configured to press the original placed on the original table:
a light source configured to irradiate the original with light;
a reader configured to read the original that is irradiated with light by the light source to output image information while moving a reading position in a first direction; and
a controller configured to determine a size of the original based on the image information output from the reader, wherein the controller is configured to:
obtain, by turning on the light source with the original presser being in a closed state, image information output from the reader which is at a predetermined position in the first direction;
derive a first difference value between image information of pixels separated from a pixel of interest by a first distance in a second direction perpendicular to the first direction, and a second difference value between a maximum image information and a minimum image information within a plurality of ranges of a second distance, which is larger than the first distance, from the pixel of interest in the second direction;
determine whether the pixel of interest is a pixel of an original edge based on the first difference value and the second difference value; and
detect a size of the original based on a position of the pixel of interest in a case where the pixel of interest is the pixel of the original edge.

2. The image reading apparatus according to claim 1, wherein the controller includes is further configured to:
compare the first difference value with a first threshold value for distinguishing between a luminance value caused by the original edge and a luminance value caused by a background so as to obtain a first comparison result; and
compare the second difference value with a second threshold value for determining a shadow caused by the original edge based on a difference value between the luminance values so as to obtain a second comparison result,
wherein the controller is configured to determine whether the pixel of interest is the pixel of the original edge based on the first comparison result and the second comparison result.

3. The image reading apparatus according to claim 1, wherein the controller is further configured to determine whether the pixel of interest is the pixel of the original edge based on the first difference value, the second difference value, and an average value of luminance values of pixels within a range of a predetermined third distance from the pixel of interest.

4. The image reading apparatus according to claim 3, wherein the controller is further configured to compare the average value with a third threshold value for determining a shadow caused by the original edge based on the average value of the luminance values so as to obtain a third comparison result,
wherein the controller is configured to determine whether the pixel of interest is the pixel of the original edge based on the first difference value, the second difference value, and the third comparison result.

5. The image reading apparatus according to claim 1, wherein the controller is further configured to determine whether the pixel of interest is the pixel of the original edge based on the original image corresponding to one line.

6. The image reading apparatus according to claim 4, wherein the controller is further configured to:
determine whether the pixel of interest is a candidate pixel of the original edge based on the first difference value, the second difference value, and the third comparison result, which are exhibited by the original corresponding to each of a plurality of lines; and
determine that the pixel of interest is the pixel of the original edge in a case where at least a predetermined number of candidate pixels are present in a sub-scanning direction at the same position in the second direction, which is perpendicular to the second direction of the plurality of lines.

7. The image reading apparatus according to claim 4, wherein the controller is further configured to:
determine whether a position of the pixel of interest is a candidate position of the original edge based on the first difference value, the second difference value, and the third comparison result, which are exhibited by the original image corresponding to each of a plurality of lines separated from each other in a sub-scanning direction; and
determine that the candidate position of the original edge is the original edge in a case where the candidate position of the original edge is present in the plurality of lines.

8. The image reading apparatus according to claim 1, wherein the controller is further configured to output information representing the detected size of the original and image data representing the original image read by the reader to an external apparatus.

9. The image reading apparatus according to claim 1, wherein the controller is further configured to output information representing the detected size of the original and image data representing the original read by the reader to a predetermined image forming apparatus.

10. A reading method for an image reading apparatus, wherein the image reading apparatus includes:
an original table on which an original is to be placed;

an original presser configured to press the original placed on the original table; and a reader configured to read the original the reading method comprising:

irradiating the original with light reading the original that is irradiated with the light to output image information while moving a reading position in a first direction;

determining a size of the original based on the image information output from the reader;

obtaining, by irradiating the original with the original presser being in a closed state, image information output from the reader which is at a predetermined position in the first direction;

deriving a first difference value between image information of pixels separated from a pixel of interest by a first distance in a second direction perpendicular to the first direction;

deriving a second difference value between a maximum image information and a minimum image information within a plurality of ranges of a second distance, which is larger than the first distance, from the pixel of interest in the second direction;

determining whether the pixel of interest is a pixel of an original edge based on the first difference value and the second difference value; and detecting a size of the original based on a position of the pixel of interest in a case where the pixel of interest is the pixel of the original edge.

* * * * *